United States Patent
Peng et al.

(10) Patent No.: US 8,645,676 B2
(45) Date of Patent: Feb. 4, 2014

(54) METHOD AND SYSTEM FOR SETTING UP AN OPERATING CONFIGURATION OF A PORTABLE DEVICE

(75) Inventors: Wei-Hao Peng, Taipei (TW); Shang-Chien Shen, Taipei (TW); Hsing-Yi Kuo, Taipei (TW); Kuei-Kuang Lin, Taipei (TW)

(73) Assignee: Ubitus Inc., Taipei (TW)

( * ) Notice: Subject to any disclaimer, the term of this patent is extended or adjusted under 35 U.S.C. 154(b) by 655 days.

(21) Appl. No.: 12/903,285

(22) Filed: Oct. 13, 2010

(65) Prior Publication Data

US 2012/0017076 A1 Jan. 19, 2012

(30) Foreign Application Priority Data

Jul. 15, 2010 (TW) .................................. 99123339 A

(51) Int. Cl.
 *G06F 15/177* (2006.01)
(52) U.S. Cl.
 USPC ........................................................ 713/100
(58) Field of Classification Search
 USPC ........................................................ 713/100
 See application file for complete search history.

(56) References Cited

U.S. PATENT DOCUMENTS

| 8,014,768 B2* | 9/2011 | Ackley .......................... 455/420 |
| 2005/0086328 A1* | 4/2005 | Landram et al. .............. 709/220 |
| 2006/0181521 A1* | 8/2006 | Perreault et al. .............. 345/173 |
| 2007/0026935 A1* | 2/2007 | Wolf et al. ...................... 463/25 |
| 2007/0268360 A1* | 11/2007 | Ahlgren ..................... 348/14.01 |

FOREIGN PATENT DOCUMENTS

WO WO 01/80577 A1 * 10/2001

* cited by examiner

*Primary Examiner* — Chun Cao
(74) *Attorney, Agent, or Firm* — Alan Kamrath; Kamrath IP Lawfirm, P.A.

(57) ABSTRACT

A system and method for setting up an operating configuration of a portable electronic device is used for a server. The server includes a device database and is provided to the portable electronic device for logging in through a communication network and operating software. The method includes the steps of: accepting the portable electronic device login; determining whether the device database is a device profile of the portable electronic device; and if yes, generating operating configuration information. The operating configuration information includes the operating configuration of altering the operating configuration of the portable electronic device.

16 Claims, 14 Drawing Sheets

METHOD AND SYSTEM FOR SETTING UP AN OPERATING CONFIGURATION OF A PORTABLE DEVICE

BACKGROUND OF THE INVENTION

1. Field of the Invention

The present invention relates to a method for setting up an operating configuration of a portable electronic device capable of allowing the portable electronic device to operate personal computer operable games, and a system using the method. More particularly, the present invention relates to a method for setting up an operating configuration of a portable electronic device which can alter the operating configuration of the portable electronic device through a cloud server, and a system using the method.

2. Description of the Related Art

Currently, many games are operated on network servers for a single user or multiple users to connect through a network. However, the operating methods of these games are usually designed for personal computers or specific game consoles to operate, such as using a mouse to control the movement of a game object, using a keyboard to send a command, or using a joystick to operate various kinds of operations.

The design of each kind of electronic product is constantly focusing on a compact and smaller size. In order to achieve this goal, the traditional keypads of mobile phones (especially smart phones) are gradually being replaced by full-screen touch control functions. Many novel smart phones can be operated through touch screens. However, neither a mobile phone with a full-screen touch control function nor a mobile phone with a keypad can successfully operate the abovementioned games. For example, in a car racing game, a gaming racing wheel or a keyboard is always required to control the driving direction, and a gaming accelerator/brake pedal or a keyboard is always required to control the speed. However, a mobile phone with a touch screen cannot operate traditional games designed for personal computers or other game consoles due to the lack of keys. Although there are games specially developed for being operated on mobile phones, these games are very simple and do not need too many operations due to the capability limitations of mobile phones, which cannot satisfy users.

Therefore, there is a need to provide a method for setting up an operating configuration of portable electronic devices and a system using the method to mitigate and/or obviate the aforementioned problems.

SUMMARY OF THE INVENTION

It is an object of the present invention to provide a method for setting up an operating configuration of a portable electronic device.

To achieve the abovementioned object, the method for setting up an operating configuration of a portable electronic device of the present invention is used for a server. The server comprises a device database, and the server is provided to the portable electronic device for logging in through a network. The method comprises the following steps: accepting the login of the portable electronic device; determining whether the device database comprises a device profile of the portable electronic device, with the device profile comprising information of at least one input device or at least one function device of the portable electronic device; and if the device database comprises the device profile of the portable electronic device, generating operating configuration information according to the device profile, with the operating configuration information comprising information on altering the operating configuration of the portable electronic device.

In one embodiment of the present invention, the method further comprises the following steps before the step of altering the operating configuration of the portable electronic device according to the device profile: accepting a selection of software, with the software comprising software operating information; and altering the operating configuration of the portable electronic device according to the software operating information and the device profile to generate the operating configuration information. Therefore, after the portable electronic device reads the operating configuration information, the portable electronic device can alter the operating configuration of the portable electronic device to operate the software.

It is another object of the present invention to provide a method for setting up an operating configuration of a portable electronic device used for a portable electronic device. The portable electronic device can log in to a server through a network to operate software. The method comprises the following steps: logging in to the server; accepting a selection of software; reading the operating configuration information; and altering the operating configuration of the portable electronic device according to the operating configuration information, such that the portable electronic device can operate the software.

In one embodiment of the present invention, the method further comprises the following steps after the step of altering the operating configuration of the portable electronic device according to the operating configuration information: accepting customized operating configuration information, with the customized operating configuration information comprising information set up by a user regarding functions corresponding to at least one input device or at least one function device; and altering the operating configuration of the portable electronic device according to the customized operating configuration information.

It is yet another object of the present invention to provide a system for setting up an operating configuration of a portable electronic device, with the system comprising a server and a portable electronic device.

The server comprises a login module, a device database, a software database, and a setup module. The login module is used for allowing the portable electronic device to log in to the server through a network. The device database comprises a device profile of the portable electronic device. The software database comprises at least one software, with the at least one software comprising software operating information. The setup module is electrically connected to the login module, the device database and the software database. The setup module is used for generating operating configuration information according to the software operating information and the device profile, with the operating configuration information comprising information on altering the operating configuration of the portable electronic device.

The portable electronic device comprises a reading module and a control module. The reading module is used for reading the operating configuration information. The control module is electrically connected to the reading module, and the control module is used for altering the operating configuration of the portable electronic device according to the operating configuration information.

Therefore, when the portable electronic device is connected to the server through the network, the portable electronic device selects at least one software, and the control module alters the operating configuration of the portable electronic device according to the operating configuration information, such that the portable electronic device can operate the software.

In one embodiment of the present invention, the portable electronic device further comprises a customization operating configuration module. The customization operating configuration module is electrically connected to the control module, and the customization operating configuration module is used for allowing a user to set up the operating configuration of the portable electronic device.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, similar reference numerals denote similar elements throughout the several views.

DETAILED DESCRIPTION OF THE PREFERRED EMBODIMENTS

Figure 1:
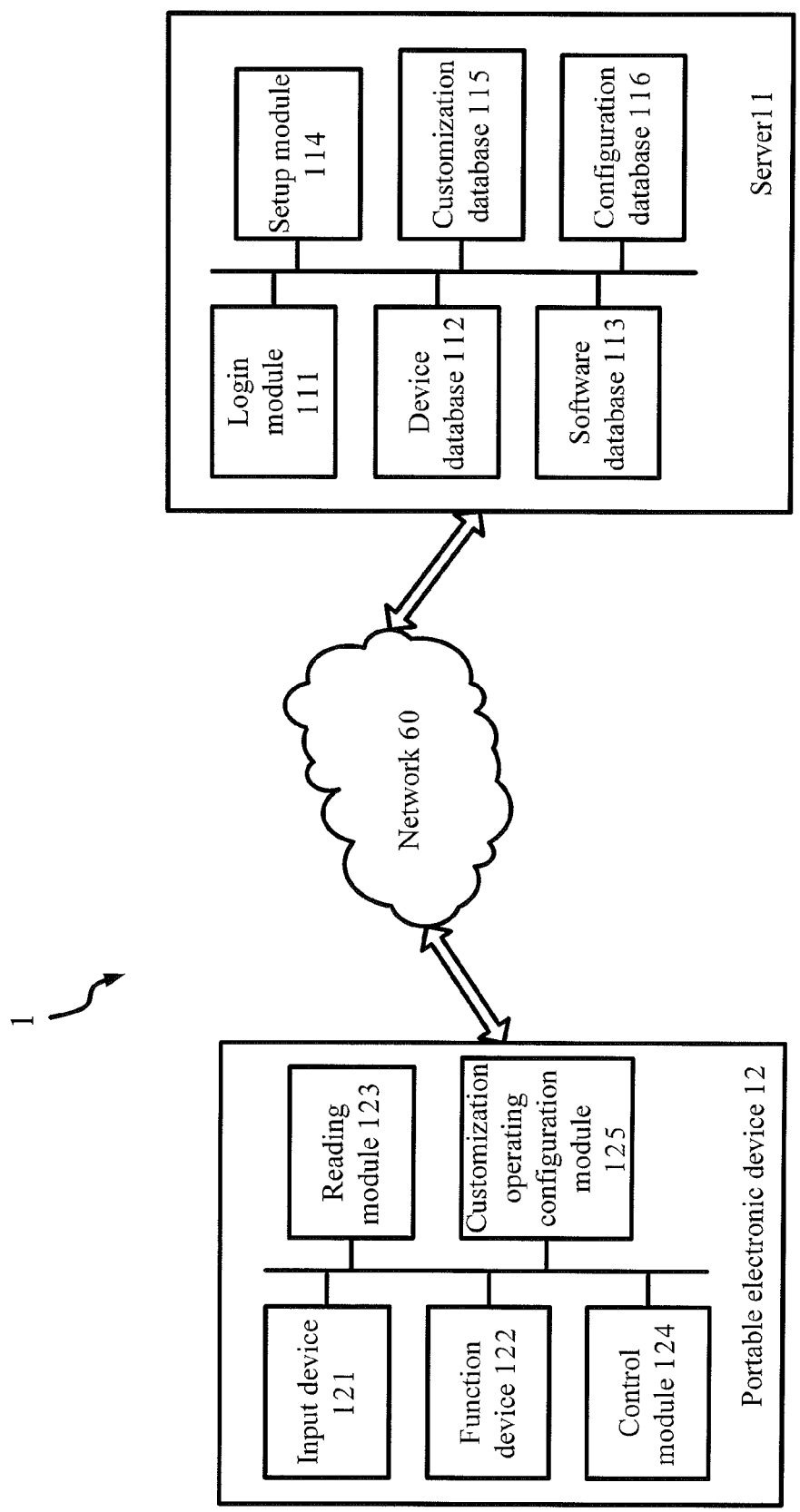
FIG. 1 illustrates a structural schematic drawing of a system for setting up an operating configuration of a portable electronic device according to one embodiment of the present invention.

Please refer to FIG. 1, which illustrates a structural schematic drawing of a system for setting up an operating configuration of a portable electronic device according to one embodiment of the present invention.

As shown in FIG. 1, in one embodiment of the present invention, the system for setting up an operating configuration of a portable electronic device 1 comprises a server 11 and a portable electronic device 12.

In one embodiment of the present invention, the server 11 comprises a login module 111, a device database 112, a software database 113, a setup module 114, a customization database 115, and a configuration database 116.

In one embodiment of the present invention, the login module 111 is used for allowing the portable electronic device 12 to log in to the server 11 through a network 60. The device database 112 comprises a device profile of the portable electronic device 12. The device profile comprises information of an input device 121 and a function device 122 of the portable electronic device 12. The software database 113 comprises at least one software. The at least one software comprises software operating information. The customization database 115 is used for storing customized operating configuration information.

The setup module 114 is electrically connected to the login module 111, the device database 112, the software database 113, the customization database 115, and the configuration database 116. The setup module 114 is used for generating operating configuration information according to the software operating information and the device profile, and the setup module 114 stores the operating configuration information into the configuration database 116. The customization database 115 is used for storing the customized operating configuration information. The explanation of the customized operating configuration information will be described in detail hereinafter. The operating configuration information comprises information on altering the operating configuration of the portable electronic device 12. Its altering method will also be described in detail hereinafter.

In one embodiment of the present invention, the portable electronic device 12 comprises an input device 121, a function device 122, a reading module 123, a control module 124, and a customization operating configuration module 125. The reading module 123 is used for reading the operating configuration information. The control module 124 is electrically connected to the input device 121, the function device 122, and the reading module 123. The control module 124 is used for altering the operating configuration of the portable electronic device 12 according to the operating configuration information. The customization operating configuration module 125 is used for allowing a user to further set up the operating configuration of the portable electronic device 12. After the user sets up the operating configuration of the portable electronic device 12 through the customization operating configuration module 125, the customization operating configuration module 125 generates the customized operating configuration information, and the control module 124 transmits the customized operating configuration information to the server 11 for being stored in the customization database 115. However, please note that the scope of the present invention is not limited to the above description.

Figure 2A:
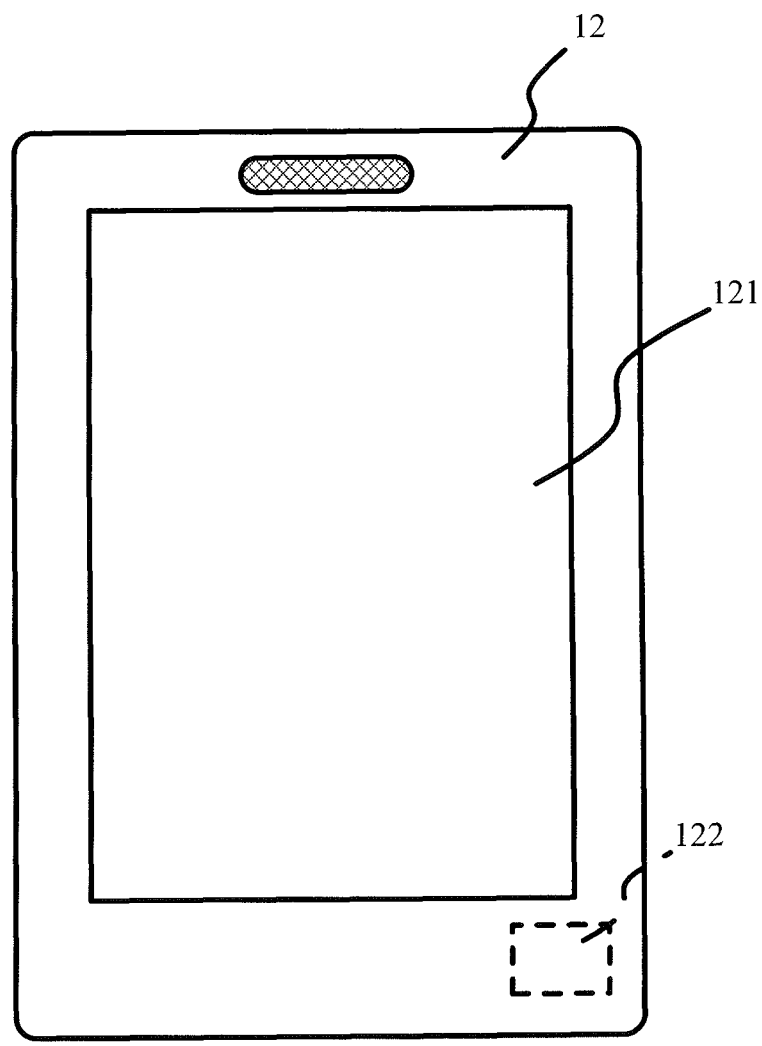
FIG. 2A illustrates a schematic drawing of the portable electronic device according to one embodiment of the present invention.
Figure 2B:
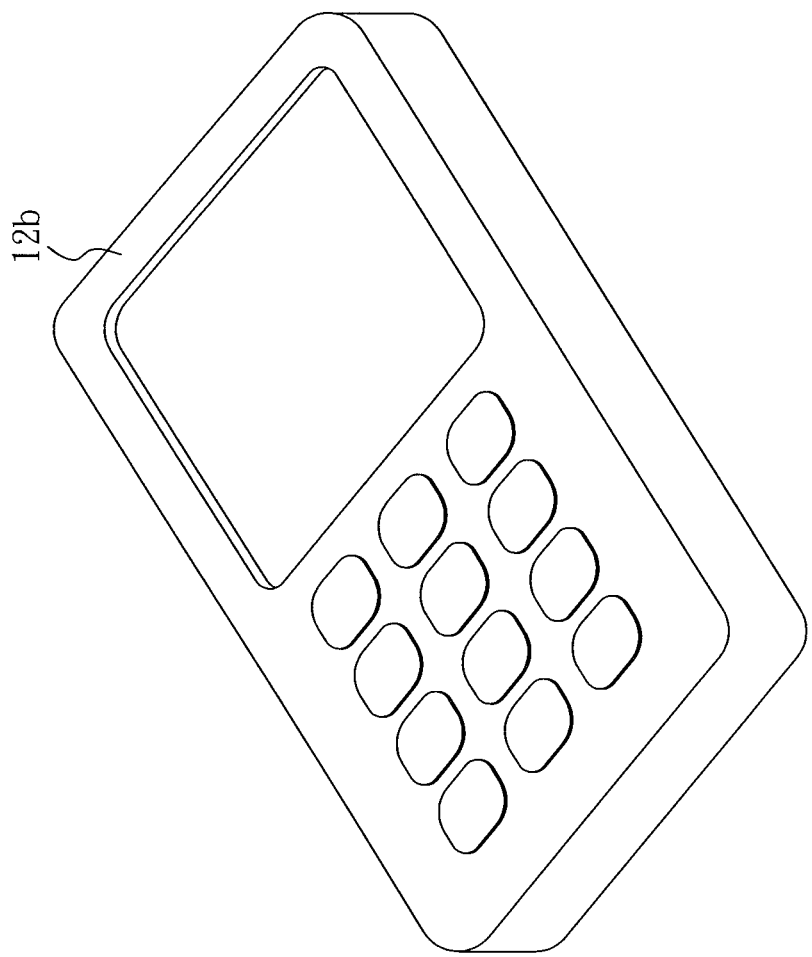
FIG. 2B illustrates a schematic drawing of the portable electronic device according to one embodiment of the present invention.

As shown in FIG. 2A, in one embodiment of the present invention, the portable electronic device 12 is a keyless smart phone, the input device 121 is a touch screen, and the function device 122 is a G-sensor, but please note that the scope of the present invention is not limited to the above description. For example, the portable electronic device 12 can also be a personal digital assistant (PDA) or other equivalent device. As shown in FIG. 2B, in another embodiment of the present invention, the portable electronic device 12b can also be a mobile phone with number keys. As long as the portable electronic device is capable of performing a network connection function, it can be used as the portable electronic device of the present invention.

In one embodiment of the present invention, each of the above-mentioned modules or devices can be designed as a hardware device, firmware, or combination thereof. Alternatively, it can be designed as a circuit loop or in another appropriate form. Furthermore, each module can be designed in either an individual form or a combinational form.

In one embodiment of the present invention, the server 11 is, but is not limited to, a cloud server applied for cloud computing. For example, the login module 111, the device database 112, the software database 113, the setup module 114, the customization database 115, and the configuration database 116 of the server 11 of the present invention can be arranged in, but are not limited to, multiple computers or servers.

In one embodiment of the present invention, the network 60 can be, but is not limited to, an Internet, a general packet radio service (GPRS), a third generation (3G) mobile communication, a high speed downlink packet access (HSDPA or 3.5G) mobile communication, a wireless fidelity (Wi-Fi) network connection, or a worldwide interoperability for microwave access (WiMAX) network connection.

FIG. 1 and FIG. 2A illustrate the system for setting up an operating configuration of a portable electronic device 1 and the portable electronic device 12 of the present invention as examples for explaining the method for setting up an operating configuration of a portable electronic device of the present invention in detail. However, please note that the scope of the present invention is not limited to the system for setting up an operating configuration of a portable electronic device 1 and the portable electronic device 12 of the present invention shown in FIG. 1 and FIG. 2A.

Please refer to FIGS. 1 to 8 regarding the method for setting up an operating configuration of a portable electronic device according to one embodiment of the present invention.

Figure 3:
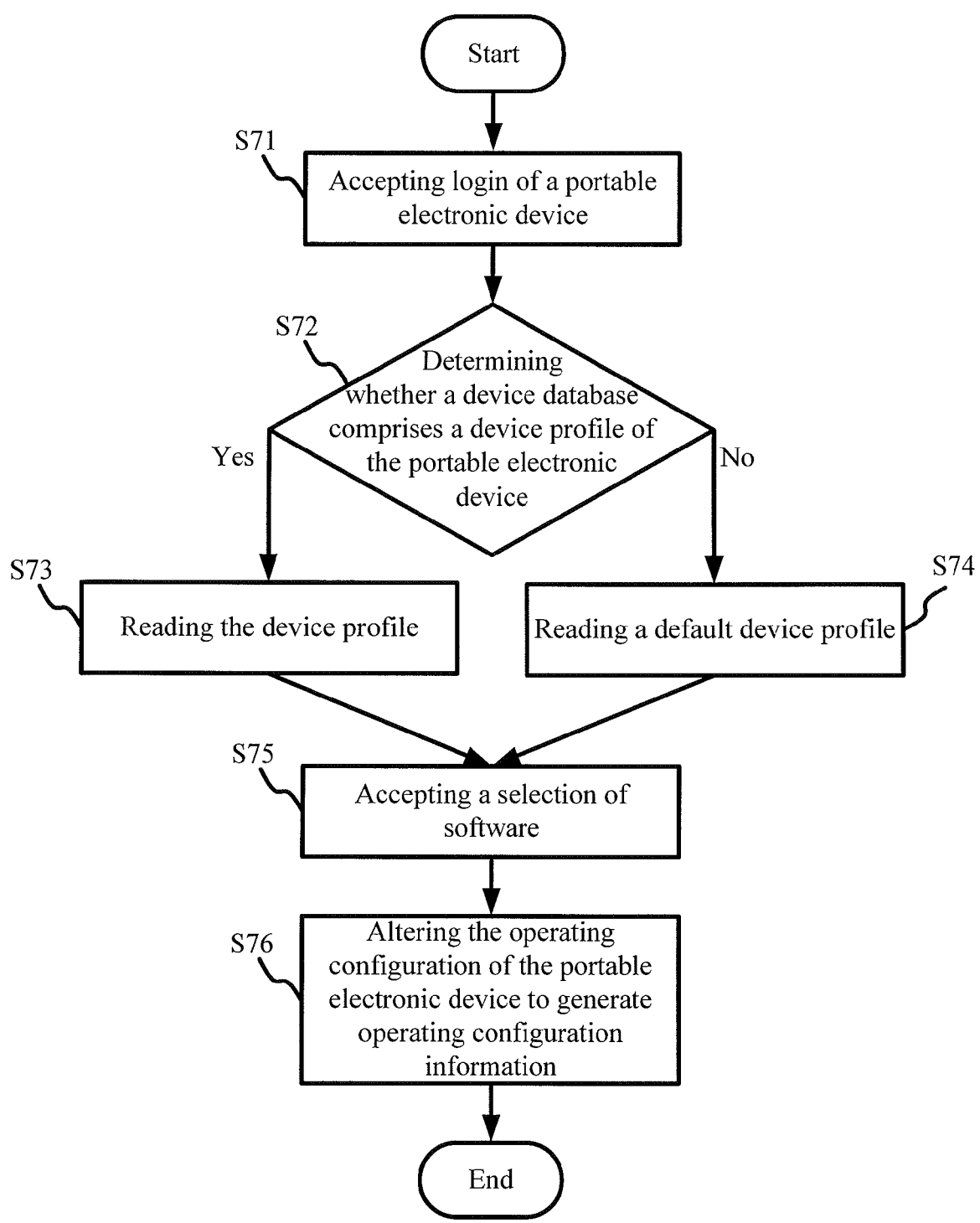
FIG. 3 illustrates a flowchart of a method for setting up an operating configuration of the portable electronic device according to one embodiment of the present invention.

As shown in FIG. 3, the present invention first performs step S71: accepting a login of a portable electronic device.

In one embodiment of the present invention, the login module 111 is used for allowing the portable electronic device 12 to log in to the server 11 through the network 60. The login module 111 can obtain information of the portable electronic device 12 such as, but not limited to, its brand name or model number.

Then, the method performs step S72: determining whether a device database comprises a device profile of the portable electronic device.

In one embodiment of the present invention, the setup module 114 can search the device database 112 to find out whether there is a device profile corresponding to the brand name or model number of the portable electronic device 12.

If the device database 112 comprises the device profile of the portable electronic device 12, the method then performs step S73: reading the device profile.

Figure 4:
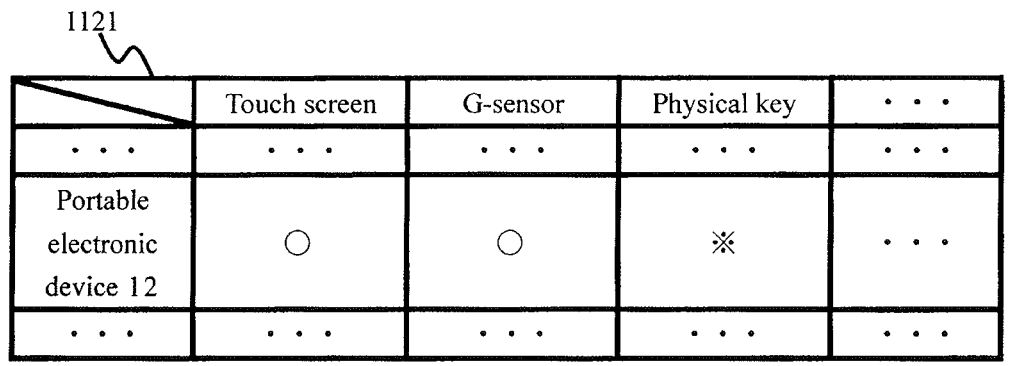
FIG. 4 illustrates a schematic drawing of a device profile according to one embodiment of the present invention.

As shown in FIG. 4, if the device database 112 comprises the device profile 1121 of the portable electronic device 12, the setup module 114 then reads the device profile 1121. The device profile 1121 is capable of displaying information on the capabilities with which the input device 121 or the function device 122 of the portable electronic device 12 is equipped. In one embodiment of the present invention, the input device 121 of the portable electronic device 12 is a touch screen, and the function device 122 of the portable electronic device 12 is a G-sensor (as shown in FIG. 2A). Generally, the touch screen not only allows the user to browse a screen but also provides the user with various kinds of touch control function operations. The G-sensor can detect the acceleration of the portable electronic device 12. Please note that the scope of the present invention is not limited to the above description.

If the device database 112 does not comprise the device profile of the portable electronic device 12, the method then performs step S74: reading a default device profile.

In one embodiment of the present invention, the device database 112 further comprises a default device profile (not shown in figures). If the device database 112 does not comprise the device profile of the portable electronic device 12, the default device profile is applicable for the unidentified portable electronic device 12.

After step S73 or step S74, the method then performs step S75: accepting a selection of software.

Figure 5:
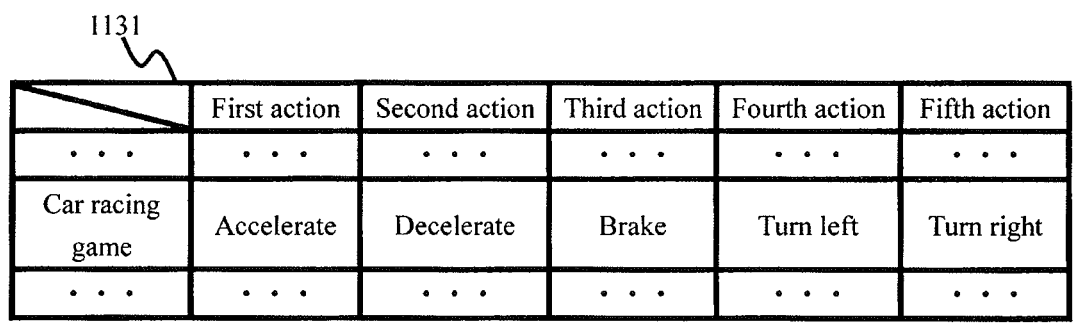
FIG. 5 illustrates a schematic drawing of software operating information according to one embodiment of the present invention.

In one embodiment of the present invention, the portable electronic device 12 selects software from the software database 113. The software is, but is not limited to, a car racing game. Please note that any type of game or program can be used as the software of the present invention. As shown in FIG. 5, in one embodiment of the present invention, the software comprises software operating information 1131. In one embodiment of the present invention, the car racing game requires five actions to operate. The first action refers to accelerate, the second action refers to decelerate, the third action refers to brake, the fourth action refers to turn left, and the fifth action refers to turn right. Please note that the scope of the present invention is not limited to the above description.

Then, the method performs step S76: altering the operating configuration of the portable electronic device to generate operating configuration information.

Figure 6:
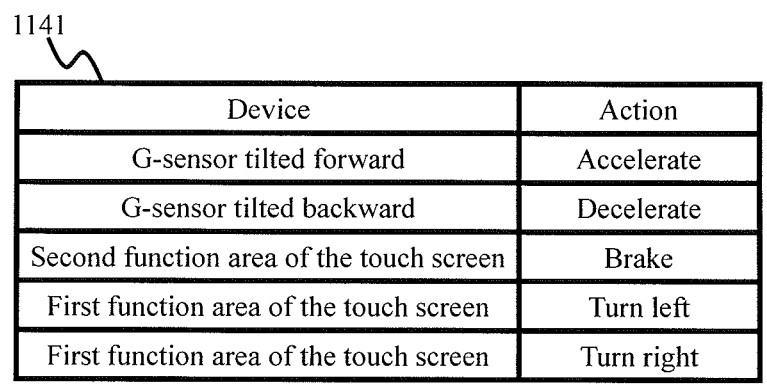
FIG. 6 illustrates a schematic drawing of operating configuration information according to one embodiment of the present invention.

In one embodiment of the present invention, the setup module 114 alters the operating configuration of the portable electronic device 12 according to the software operating information 1131 and the device profile 1121, to generate the operating configuration information (as shown in FIG. 6). In one embodiment of the present invention, the setup module 114 can optimize the matching of each action for operating the software with the input device 121 or the function device 122 of the portable electronic device 12. However, please note that the scope of the present invention is not limited to the above description.

In one embodiment of the present invention, the operating configuration information 1141 is stored in, but is not limited to, the configuration database 116.

In one embodiment of the present invention, step S76 further comprises step S761 and step S762.

Figure 7:
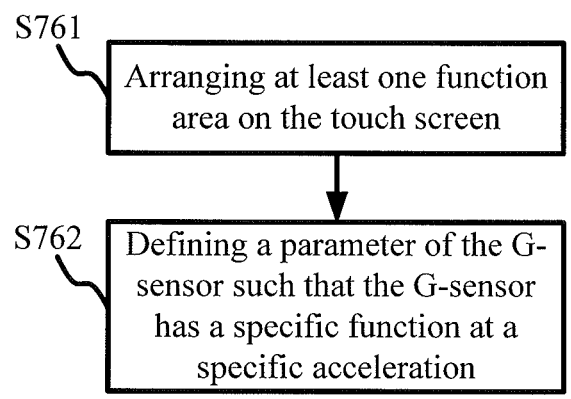
FIG. 7 illustrates a flowchart of the method for setting up an operating configuration of the portable electronic device according to one embodiment of the present invention.

As shown in FIG. 7, step S761 is arranging at least one function area on the touch screen.

Step S762 is defining a parameter of the G-sensor such that the G-sensor has a specific function at a specific acceleration.

Figure 8:
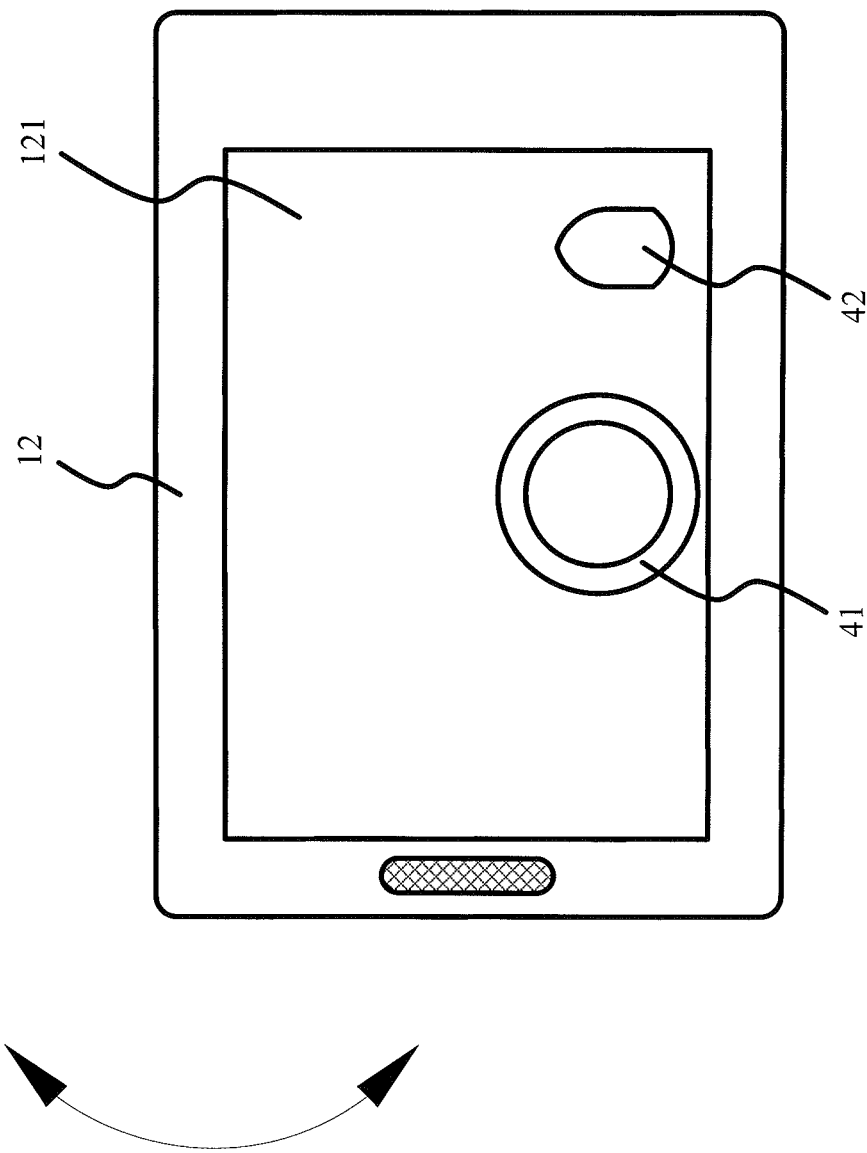
FIG. 8 illustrates a schematic drawing of the portable electronic device after its operating configuration has been altered according to one embodiment of the present invention.

As shown in FIG. 6 and FIG. 8, in one embodiment of the present invention, the setup module 114 can arrange a first function area 41 and a second function area 42 on the input device 121 (i.e., the touch screen) of the portable electronic device 12. The first function area 41 has a specific function of a racing wheel, and the second function area 42 has a specific function for braking. In one embodiment of the present invention, the setup module 114 defines that the specific function is to accelerate when the function device 122 (i.e., the G-sensor) senses the movement of tilting forward, and the setup module 114 defines that the specific function is to decelerate when the function device 122 senses the movement of tilting backward. However, please note that the scope of the present invention is not limited to the above description.

In one embodiment of the present invention, when the server 11 transmits the software to the portable electronic device 12, the server 11 would convert the content of the software into a video stream format for being transmitted. The first function area 41 and the second function area 42 can display a translucent effect by an Alpha-Blending technique. Therefore, the first function area 41 and the second function area 42 can be superimposed on the screen of the software without influencing the display of the screen of the software. However, please note that the scope of the present invention is not limited to the above description.

Figure 9:
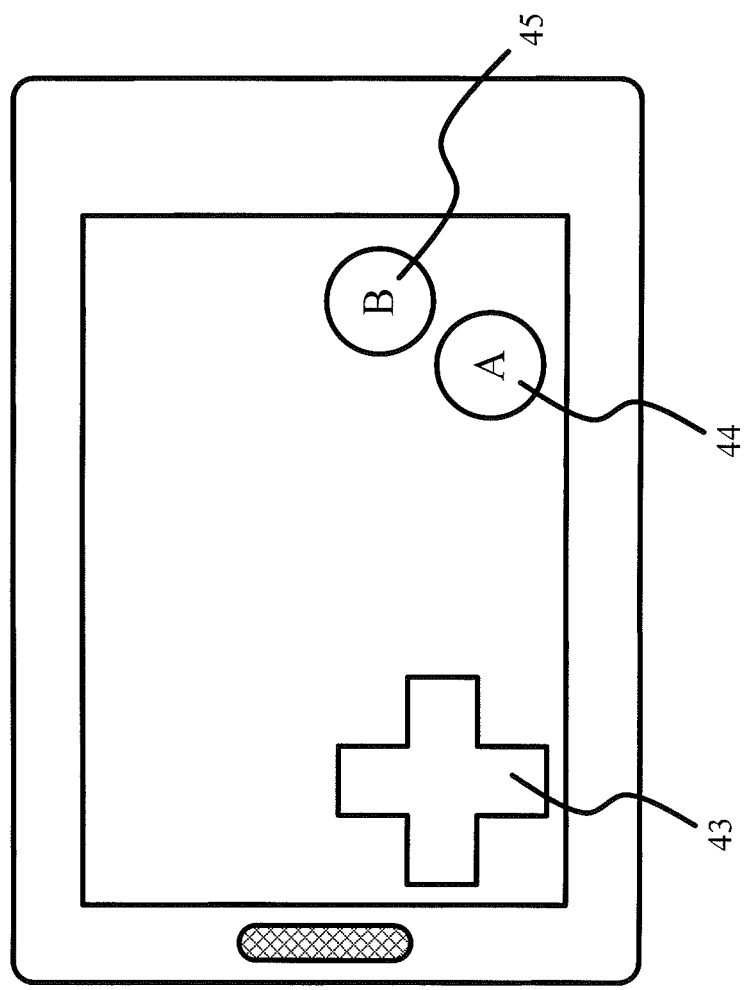
FIG. 9 illustrates a schematic drawing of the portable electronic device after its operating configuration has been altered according to another embodiment of the present invention.

Please also note that the scope of the present invention is not limited to the shapes and functions of the first function area 41 and the second function area 42 as shown in FIG. 8. Please refer to FIG. 9. In another embodiment of the present invention, the function areas of the present invention can be arranged as, but are not limited to, a cross key operating area 43, an A key operating area 44, and a B key operating area 45.

Figure 10:
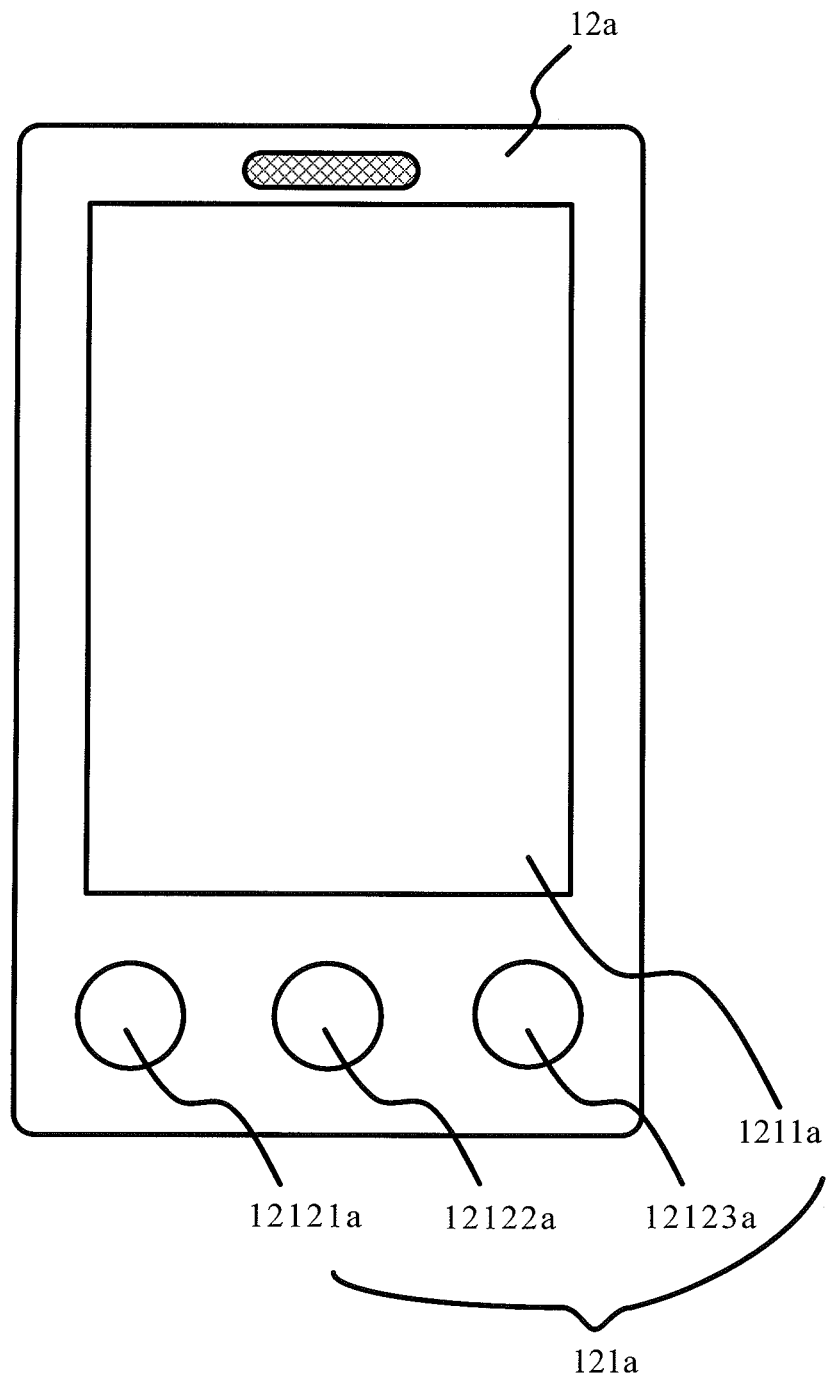
FIG. 10 illustrates a schematic drawing of the portable electronic device according to another embodiment of the present invention.
Figure 11:
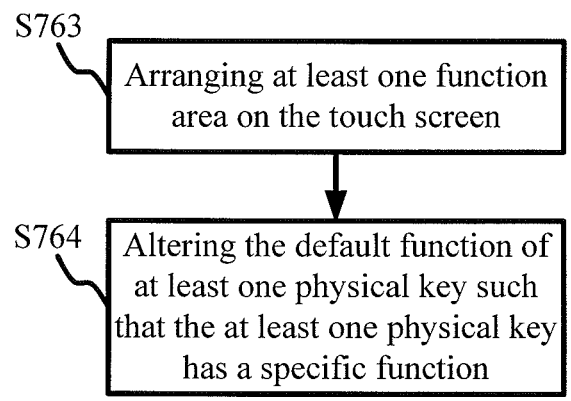
FIG. 11 illustrates a flowchart of the method for setting up an operating configuration of the portable electronic device according to another embodiment of the present invention.

In another embodiment of the present invention, as shown in FIG. 10, the portable electronic device 12*a* is a smart phone with keys. The input device 121*a* comprises a touch screen 1211*a* and physical keys 12121*a*, 12122*a*, and 12123*a*. Step S76 further comprises step S763 and step S764. As shown in FIG. 11, step S763 is arranging at least one function area on the touch screen, and step S764 is altering the default function of at least one physical key, such that the at least one physical key has a specific function.

Figure 12:
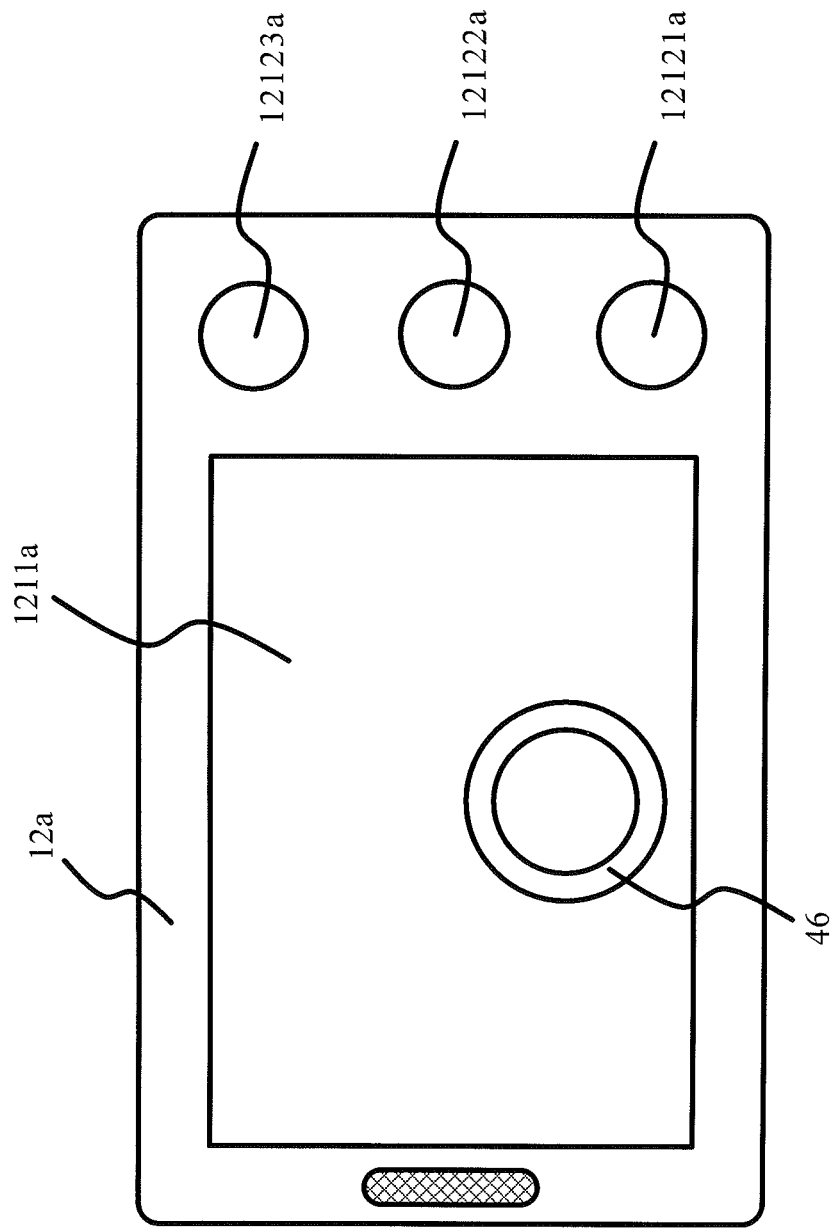
FIG. 12 illustrates a schematic drawing of the portable electronic device after its operating configuration has been altered according to another embodiment of the present invention.

Therefore, as shown in FIG. 12, in another embodiment of the present invention, the setup module (not shown in FIG. 12, please refer to FIG. 1) can arrange a third function area 46 on the touch screen 1211*a* of the portable electronic device 12*a*. The third function area 46 has a specific function of a racing wheel. In another embodiment of the present invention, the setup module will equip the physical key 12121*a* with a specific function for decelerating, equip the physical key 12122*a* with a specific function for braking, and equip the physical key 12123*a* with a specific function for accelerating.

In another embodiment of the present invention, the server can further comprise a matching database (not shown in figures). The matching database comprises matched data of each kind of portable electronic device and each type of software, such that the setup module can alter the operating configuration of the portable electronic device according to the matched data without performing another matching procedure.

Figure 13:
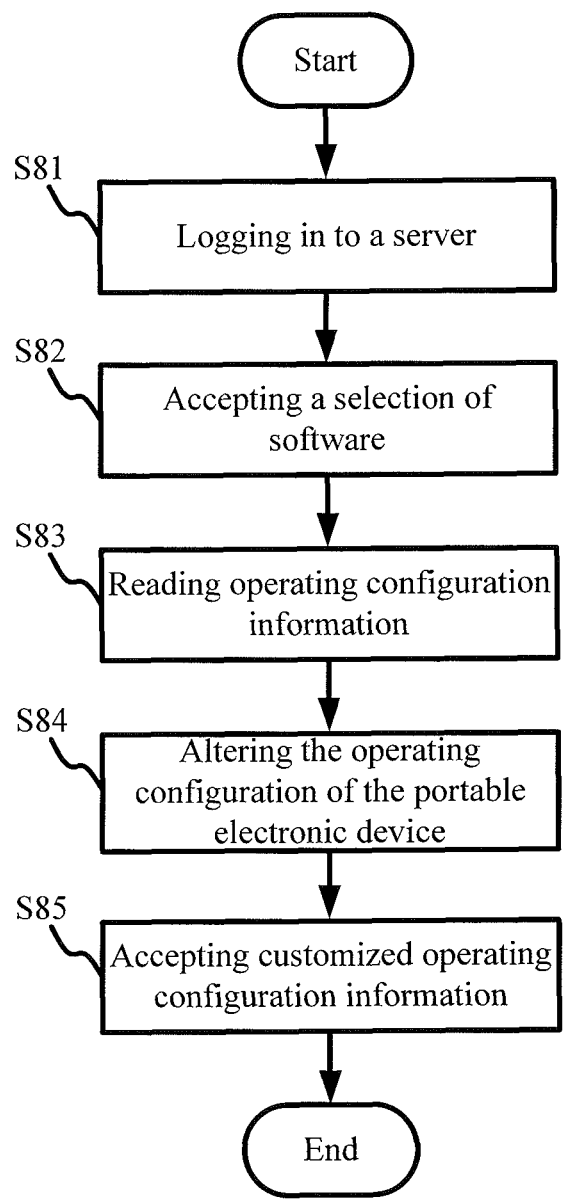
FIG. 13 illustrates a flowchart of the method for setting up an operating configuration of the portable electronic device according to one embodiment of the present invention.

As shown in FIG. 13, the present invention further performs step S81: logging in to a server.

In one embodiment of the present invention, the portable electronic device 12 logs in to the server 11 through the network 60.

Then, the method performs step S82: accepting a selection of software.

In one embodiment of the present invention, the portable electronic device 12 accepts one software selected by the user from the software database 113.

Then, the method performs step S83: reading operating configuration information.

In one embodiment of the present invention, after the setup module 114 generates the operating configuration information 1141, the reading module 123 reads the operating configuration information 1141 (as shown in FIG. 6).

Next, the method performs step S84: altering the operating configuration of the portable electronic device.

In one embodiment of the present invention, the control module 124 alters the operating configuration of the portable electronic device 12 according to the operating configuration information 1141.

Finally, the method performs step S85: accepting customized operating configuration information.

Figure 14:
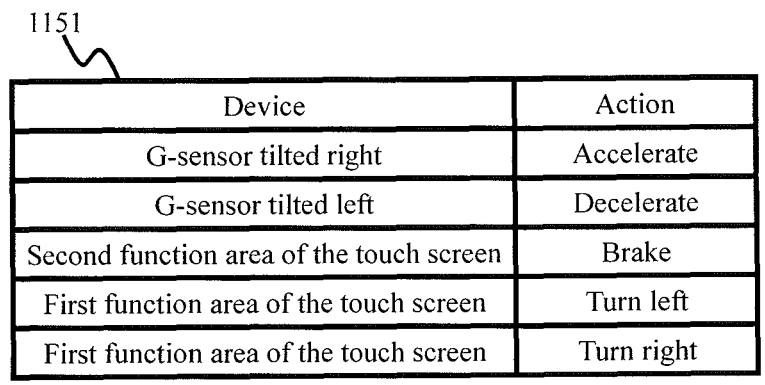
FIG. 14 illustrates a schematic drawing of customized operating configuration information according to one embodiment of the present invention.

In one embodiment of the present invention, if the user is not satisfied with the altered operating configuration of the portable electronic device 12 (for example, the user is left-handed, but the original operating configuration of the portable electronic device 12 is designed for a right-handed user), the user can further alter the operating configuration of the portable electronic device 12 through the customization operating configuration module 125 to generate the customized operating configuration information. The customized operating configuration information comprises, but is not limited to, information set up by the user regarding functions corresponding to the input device 121 or the function device 122. As shown in FIG. 14, in one embodiment of the present invention, if the user does not accept the arrangement of the operating configuration information 1141, the user alters the operating configuration of the portable electronic device 12 through the customization operating configuration module 125 to generate the customized operating configuration information 1151 to meet his/her operating preference. In this embodiment, the user defines the specific function to accelerate when the function device 122 senses the movement of tilting right, and the user defines the specific function to decelerate when the function device 122 senses the movement of tilting left. However, please note that the scope of the present invention is not limited to the above description.

In one embodiment of the present invention, the control module 124 can transmit the customized operating configuration information 1151 to the server 11 for being stored in the customization database 115. However, please note that the scope of the present invention is not limited to the above description. In one embodiment of the present invention, when the same user uses the same portable electronic device 12 to log in to the server 11 and selects the same software, the system for setting up an operating configuration of a portable electronic device 1 can provide the pre-stored customized operating configuration information, thereby achieving a time-saving effect. In another embodiment of the present invention, different users can also use the pre-stored customized operating configuration information set up by other users. However, please note that the scope of the present invention is not limited to the above description.

Please note that for those who are familiar with the technical field of the present invention, the abovementioned steps of the present invention can be performed in other sequences or at the same time to achieve the object of the present invention.

According to the method for setting up an operating configuration of a portable electronic device of the present invention, the problem of being unable to freely operate each kind of software of the portable electronic device can be solved, and also the following advantages can be provided: 1. The user can set up the operating configuration of the portable electronic device 12 by his/herself to achieve a customization effect; and 2. The same software can be provided for use by each kind of portable electronic device 12 to avoid further adjustment to each kind of portable electronic device 12 or even re-development of new software, thereby reducing research and development costs of the software.

Although the present invention has been explained in relation to its preferred embodiments, it is to be understood that many other possible modifications and variations can be made without departing from the spirit and scope of the invention as hereinafter claimed.

What is claimed is:

1. A method for setting up an operating configuration of a portable electronic device, used for a server, with the server comprising a device database and provided to the portable electronic device for logging in through a network to operate software, the method comprising:
   accepting a login of the portable electronic device;
   determining whether the device database comprises a device profile of the portable electronic device, wherein the device profile comprises information of at least one input device or at least one function device of the portable electronic device; and
   if the device database comprises the device profile of the portable electronic device, generating operating configuration information according to the device profile and altering the operating configuration of the portable electronic device according to the device profile.

2. The method for setting up an operating configuration of a portable electronic device as claimed in claim 1, further comprising before altering the operating configuration of the portable electronic device according to the device profile:
   accepting a selection of the software, wherein the software comprises software operating information; and
   altering the operating configuration of the portable electronic device according to the software operating information and the device profile to generate the operating configuration information;
   wherein after the portable electronic device accepts the operating configuration information, the portable electronic device alters the operating configuration of the portable electronic device to operate the software.

3. The method for setting up an operating configuration of a portable electronic device as claimed in claim 2, further comprising before altering the operating configuration of the portable electronic device according to the device profile:
   altering the operating configuration of the portable electronic device according to the software operating information, the device profile, and customized operating configuration information to generate the operating configuration information, wherein the customized operating configuration information is information set up by a user regarding the operating configuration of the portable electronic device.

4. The method for setting up an operating configuration of a portable electronic device as claimed in claim 1, wherein the at least one input device comprises a touch screen, and the method further comprises within generating the operating configuration information according to the device profile:
   arranging at least one function area on the touch screen, wherein the at least one function area has a specific function.

5. The method for setting up an operating configuration of a portable electronic device as claimed in claim 1, wherein the at least one function device comprises a G-sensor, and the method further comprises within generating the operating configuration information according to the device profile:
   defining a parameter of the G-sensor with the G-sensor having a specific function at a specific acceleration.

6. The method for setting up an operating configuration of a portable electronic device as claimed in claim 1, wherein the server comprises a cloud server applied for cloud computing.

7. The method for setting up an operating configuration of a portable electronic device as claimed in claim 1, wherein the software comprises a game.

8. A method of setting up an operating configuration of a portable electronic device, used for a portable electronic device, logging into a server through a network to operate software, the method comprising:
   logging in to the server; accepting a selection of the software; reading operating configuration information;
   altering the operating configuration of the portable electronic device according to the operating configuration information;
   wherein the portable electronic device operates the software; and
   after altering the operating configuration of the portable electronic device according to the operating configuration information;
   accepting customized operating configuration information, wherein the customized operating configuration information comprises information set UP by a user regarding functions corresponding to at least one input device or at least one function device; and
   altering the operating configuration of the portable electronic device according to the customized operating configuration information.

9. The method for setting up an operating configuration of a portable electronic device as claimed in claim 8, wherein the server comprises a cloud server.

10. The method for setting up an operating configuration of a portable electronic device as claimed in claim 8, wherein the software comprises a game.

11. A system comprising:
   a portable electronic device including an operating configuration and a device profile;
   a server comprising:
      a login module allowing the portable electronic device to log in to the server through a network;
      a device database comprising the device profile of the portable electronic device;
      a software database comprising at least one software, wherein the at least one software comprises software operating information; and
      a setup module electrically connected to the login module, the device database and the software database, with the setup module generating operating configuration information according to the software operating information and the device profile, wherein the operating configuration information comprises information of altering the operating configuration of the portable electronic device;
   with the portable electronic device further comprising:
      a reading module reading the operating configuration information; and
      a control module electrically connected to the reading module, with the control module altering the operating configuration of the portable electronic device according to the operating configuration information;
   wherein each of the login module, the device database, the software database, the setup module, the reading module, and the control module is configured as a hardware device, a firmware, or an electric circuit; and wherein when the portable electronic device is connected to the server through the network, the portable electronic device selects at least one software, and wherein the control module alters the operating configuration of the portable electronic device according to the operating configuration information with the portable electronic device operating the software.

12. The system as claimed in claim 11, wherein the portable electronic device further comprises a customization operating configuration module electrically connected to the control module, with the customization operating configuration module allowing a user to set up the operating configuration of the portable electronic device.

13. The system as claimed in claim 12, wherein the customization operating configuration module generates customized operating configuration information according to the operating configuration of the portable electronic device set up by the user, wherein the server further comprises a customization database electrically connected to the setup module, wherein the customization database stores the customized operating configuration information; and wherein the setup module generates the operating configuration information according to the software operating information, the device profile, and the customized operating configuration information.

14. The system as claimed in claim 11, wherein the server further comprises a configuration database electrically connected to the setup module, and wherein the configuration database stores the operating configuration information.

15. The system as claimed in claim 11, wherein the server comprises a cloud server applied for cloud computing.

16. The system as claimed in claim 11, wherein the software comprises a game.

* * * * *